(12) United States Patent
Huffer et al.

(10) Patent No.: US 11,826,640 B2
(45) Date of Patent: Nov. 28, 2023

(54) ERGONOMICALLY CORRECT GAME CONTROLLER

(71) Applicant: Hit Box, L.L.C., Henderson, NV (US)

(72) Inventors: Dustin Huffer, Henderson, NV (US); Shawn Huffer, Henderson, NV (US)

(73) Assignee: HIT BOX, L.L.C., Las Vegas, NV (US)

( * ) Notice: Subject to any disclaimer, the term of this patent is extended or adjusted under 35 U.S.C. 154(b) by 0 days.

(21) Appl. No.: 17/844,276

(22) Filed: Jun. 20, 2022

(65) Prior Publication Data

US 2022/0387884 A1 Dec. 8, 2022

Related U.S. Application Data

(63) Continuation of application No. 16/909,174, filed on Jun. 23, 2020, now Pat. No. 11,369,867, which is a continuation of application No. 16/014,794, filed on Jun. 21, 2018, now Pat. No. 10,722,787, which is a continuation of application No. 13/312,847, filed on Dec. 6, 2011, now Pat. No. 10,022,623.

(60) Provisional application No. 61/420,245, filed on Dec. 6, 2010.

(51) Int. Cl.
A63F 13/24 (2014.01)
A63F 13/235 (2014.01)

(52) U.S. Cl.
CPC ............ *A63F 13/24* (2014.09); *A63F 13/235* (2014.09); *A63F 2300/1018* (2013.01); *A63F 2300/1031* (2013.01); *A63F 2300/1043* (2013.01)

(58) Field of Classification Search
None
See application file for complete search history.

(56) References Cited

U.S. PATENT DOCUMENTS

| 4,067,431 | A | | 1/1978 | Whitaker |
| 4,333,097 | A | | 6/1982 | Buric et al. |
| 4,891,777 | A | | 1/1990 | Lapeyre |
| 5,087,910 | A | * | 2/1992 | Guyot-Sionnest ... H01H 13/807 345/169 |
| 5,500,643 | A | | 3/1996 | Grant |
| 5,644,113 | A | * | 7/1997 | Date ...................... A63F 13/22 200/6 A |
| 5,923,317 | A | * | 7/1999 | Sayler .................. A63F 13/285 345/156 |
| 6,164,853 | A | | 12/2000 | Foote |
| 6,512,511 | B2 | | 1/2003 | Willner et al. |
| 6,760,013 | B2 | | 7/2004 | Willner et al. |
| 10,022,623 | B2 | | 7/2018 | Huffer et al. |

(Continued)

OTHER PUBLICATIONS

"Joytricks," Anderson, John. Creative Computing. vol. 8, No. 10 (Oct. 1982), All Pages.

(Continued)

*Primary Examiner* — Jason T Yen
(74) *Attorney, Agent, or Firm* — DICKINSON WRIGHT PLLC

(57) ABSTRACT

A hand operated game controller for controlling a game console. Multiple push buttons are arranged on the surface of the game controller. The push buttons are placed in an arrangement that approximately matches the natural position of the fingers of the user's hands. As the user presses the buttons, control signals are sent from the buttons to the game console via wiring.

20 Claims, 15 Drawing Sheets

(56) References Cited

U.S. PATENT DOCUMENTS

| | | | |
|---|---|---|---|
| 10,722,787 B2 | 7/2020 | Huffer et al. | |
| 2001/0003713 A1* | 6/2001 | Willner | G06F 3/0219 348/E5.103 |
| 2004/0224765 A1 | 11/2004 | Martinez et al. | |
| 2005/0239524 A1 | 10/2005 | Longman et al. | |
| 2006/0007159 A1 | 1/2006 | Lane et al. | |
| 2007/0060393 A1* | 3/2007 | Wu | A63F 13/214 463/47 |
| 2007/0066394 A1 | 3/2007 | Ikeda et al. | |
| 2007/0256913 A1 | 11/2007 | Wee et al. | |
| 2008/0303698 A1 | 12/2008 | Casparian et al. | |
| 2010/0045490 A1 | 2/2010 | Odell et al. | |

OTHER PUBLICATIONS

"Tech Radar" Hartley, Adam. CES 2009, (Jan. 2009) (https://www.techradar.com/news/gaming/official-street-fighter-iv-controllers-unveiled-499071), All Pages.

"Shoryuken" (https://forums.shoryuken.com/t/keyboard-stick-layout/100004/12), All Pages.

"Shoryuken II" (https://archive.supercombo.gg/t/what-kind-of-joystick-did-you-use-at-evolution/28719/18), All Pages.

"Shoryuken III" (https://archive.supercombo.gg/t/hit-box-we-so-s-tier1/115836/52), All Pages.

"EVO Gaming Show" (https://www.eventhubs.com/news/2009/jul/21/custom-joysticks-evo-and-interesting-setups/), All Pages.

"Custom Joysticks at EVO" Grey, Jon. EventHubs (Jul. 21, 2009) (https://www.eventhubs.com/news/2009/jul/21/custom-joysticks-evo-and-interesting-setups/), All Pages.

"Images of Unknown Origin," All Pages.

Mark Julio, Custom Mad Catz Arcade FightSticks (Album), Published Aug. 19, 2011, 2 pages, sdc10721hw, Flickr, retrieved on Feb. 23, 2022, 2 page(s).

Remarks on IDS submitted after Notice of Allowance dated Feb. 9, 2022.

* cited by examiner

ERGONOMICALLY CORRECT GAME CONTROLLER

CROSS-REFERENCE TO RELATED APPLICATIONS

This U.S. continuation application claims priority to U.S. utility patent application Ser. No. 16/909,174 filed Jun. 23, 2020, which claims priority to U.S. utility patent application Ser. No. 16/014,794 filed Jun. 21, 2018 and issued as U.S. Pat. No. 10,722,787, which claims priority to U.S. utility patent application Ser. No. 13/312,847 filed Dec. 6, 2011 and issued as U.S. Pat. No. 10,022,623, which claims priority to U.S. provisional application No. 61/420,245 filed Dec. 6, 2010.

BACKGROUND OF THE INVENTION

1. Field of the Invention

The present invention relates to electronic game consoles and, in particular, to controllers for electronic game consoles.

2. Related Art

Home video game systems are an extremely popular activity around the world. In a typical arrangement, a user operates a controller having a joystick and buttons and that is connected to a game console to control action on a monitor screen, such as the screen of a television set. While each gaming platform has its own specific design, all tend to utilize a joystick/push button arrangement. Unfortunately, the prior art placement of the buttons and utilization of the joystick is not conducive to the most efficient play. The human hand is shaped in a very specific manner with fingers positioned also in a specific manner. Prior art controllers are not designed to take advantage of the natural features of a human hand.

FIG. 1 shows a prior art Sony Playstation® Controller. Playstation® is a registered trademark of the Sony Computer Entertainment, Inc. The control buttons are labeled in the figure as shown. Buttons 40 control the left, right, up and down movement of a character across the screen. Buttons 50 control certain actions of the character. For example the triangle might control a high punch, the circle might control a low punch, a triangle might control a high kick, and an "X" might control a low kick. Buttons 60 (L1 and L2) can be configured to control various combat actions. Buttons 70 (R1 and R2) are similarly configured to control other combat actions.

What is needed is a better game controller.

SUMMARY OF THE INVENTION

The present invention provides a hand operated game controller for controlling a game console. Multiple push buttons are arranged on the surface of the game controller. The push buttons are placed in an arrangement that approximately matches the natural position of the fingers of the user's hands. As the user presses the buttons, control signals are sent from the buttons to the game console via wiring.

DETAILED DESCRIPTION OF THE PREFERRED EMBODIMENTS

The present invention is an alternative to traditional gaming controllers to provide greater speed and accuracy in the fighting game genre. The present invention recognizes that eliminating the joystick method and utilizing an all-push-button design operated by the fingertips yields greater game efficiency in an ergonomic fashion. Hence, a significant distinction of the present invention from "arcade joysticks" is the removal of the joystick entirely and replacing it with four arcade-quality directional pushbuttons. In doing so travel time and accidental inputs are near-eliminated. Game users enjoy superior control and ease of complex movements.

Figure 1:
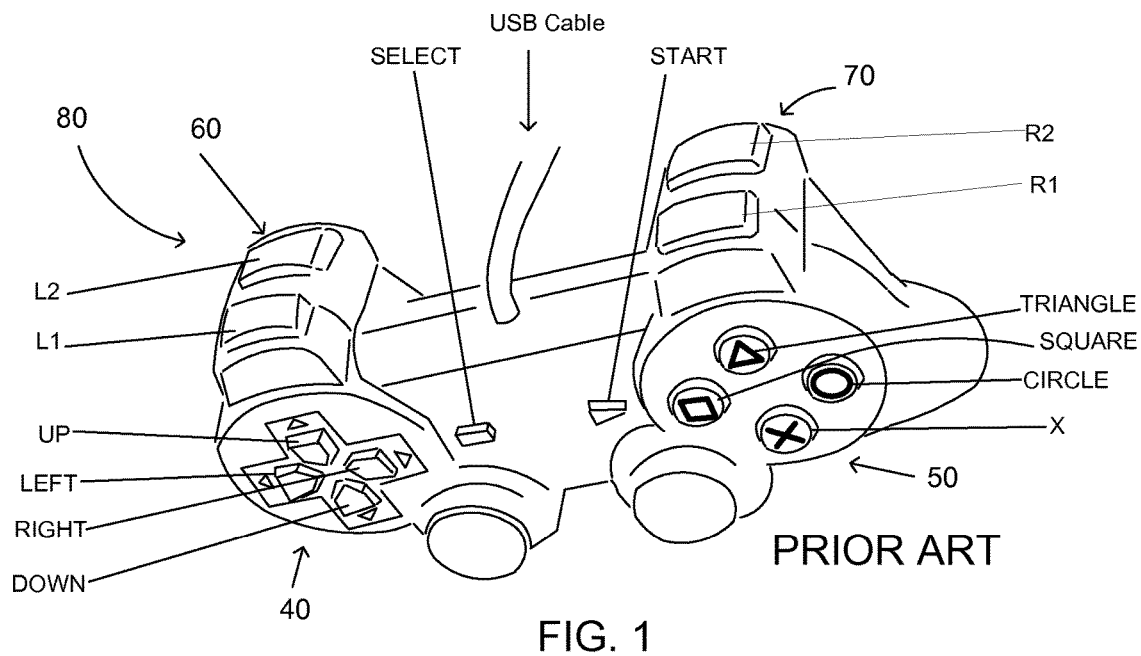
FIG. 1 shows a prior art game controller.
Figure 2:
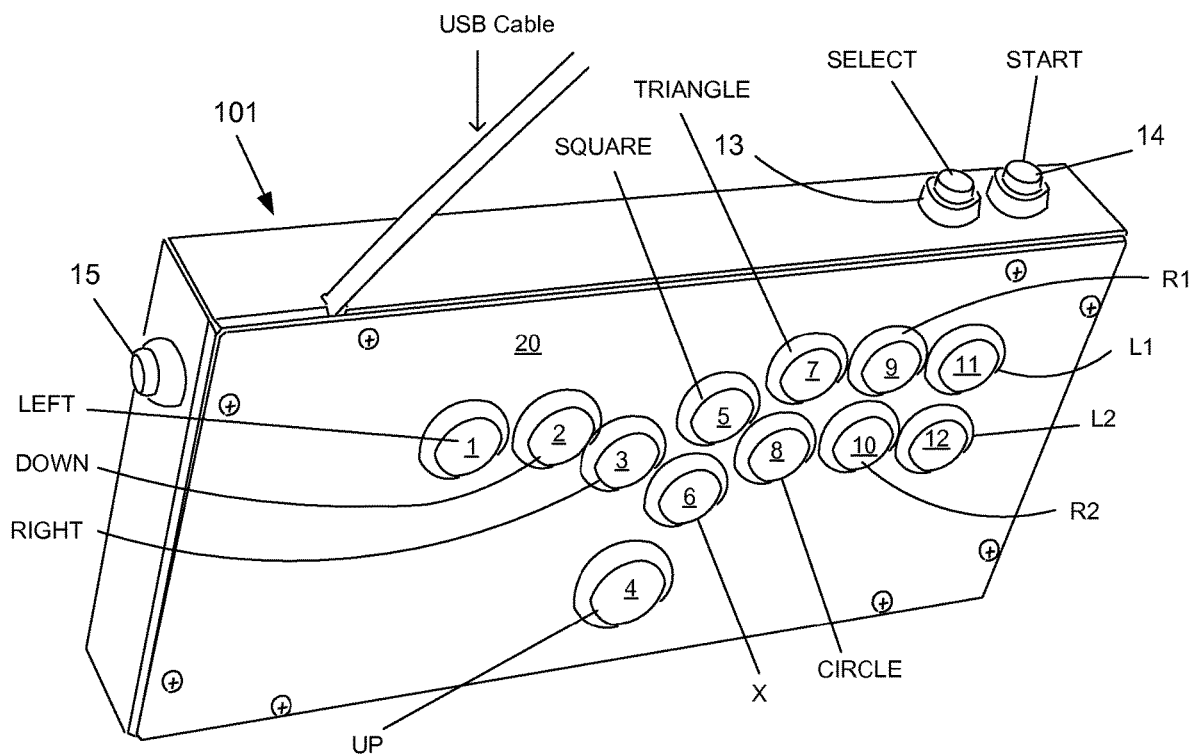
FIG. 2 shows a preferred embodiment of the present invention.

FIG. 1 shows a prior art Sony Playstation® Controller 80. The control buttons are labeled in the figure as shown. The button placement, however, is arbitrary and does not logically conform to the natural contours of a human hand. FIG. 2 preferred box shaped controller 101. The buttons have been placed on backing 20 as shown. In the embodiment shown, buttons 1-4 correspond to movement buttons 40 (FIG. 1) and buttons 5-14 correspond to function buttons 50, 60 and 70 (FIG. 1) Button placement has been carefully considered so that it matches the natural contour and shape of the human hand. In this manner, a user can more precisely control the game action. This is very important for competitive garners who are striving to achieve the highest possible score. It is much more natural to play a computer game if the button placement matches the position of the user's fingers.

Figure 3:
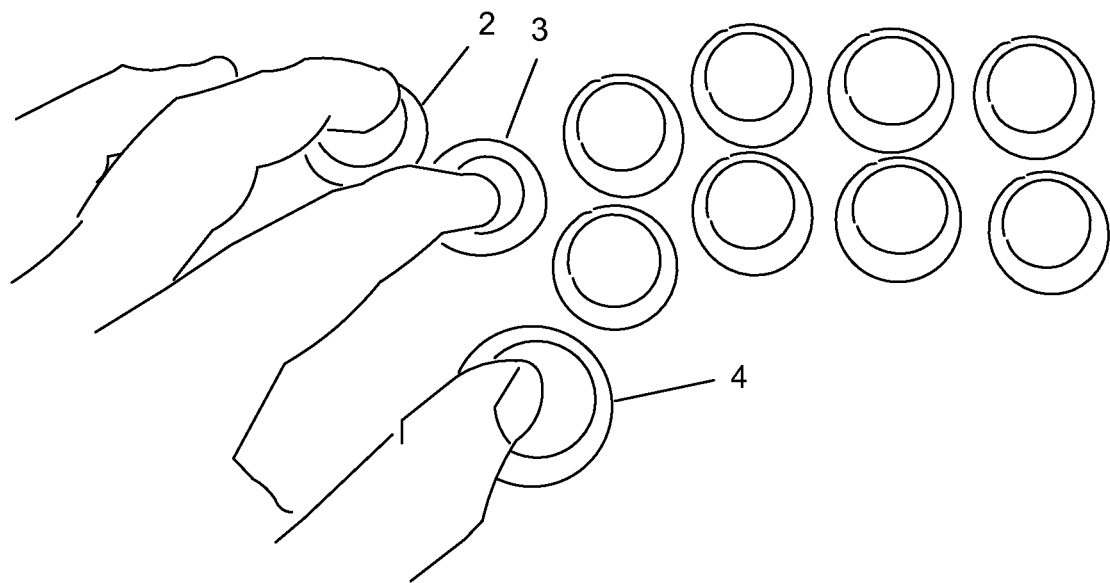
FIGS. 3 and 4 show a user operating a preferred embodiment of the present invention.
Figure 4:
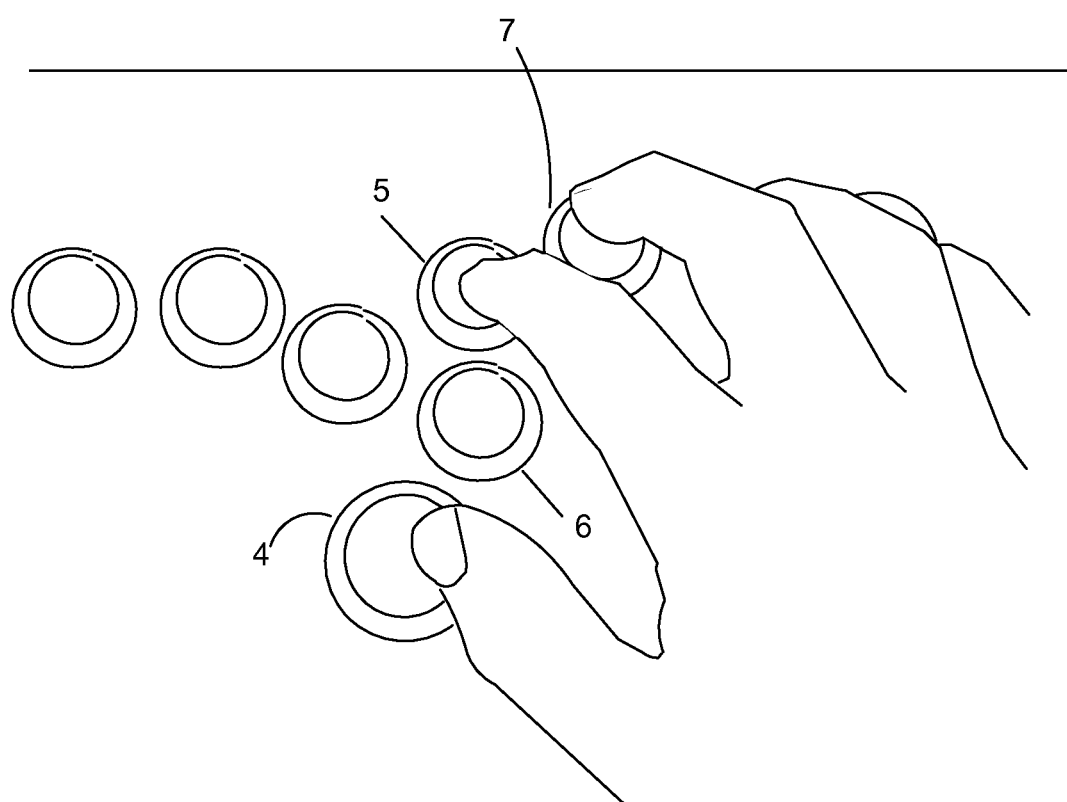

FIGS. 3 and 4 give a very good illustration of the user's hands and fingers appropriately positioned over the buttons of the embodiment shown in FIG. 2. Specifically, in FIG. 3, the left hand is positioned to control the left, right, up and down motion of a character in the game. In FIG. 4, the right hand is appropriately positioned to control fighting movements and other special motions and actions. It should be noted that the right or left thumb can equally reach "up" button 4.

Figure 5:
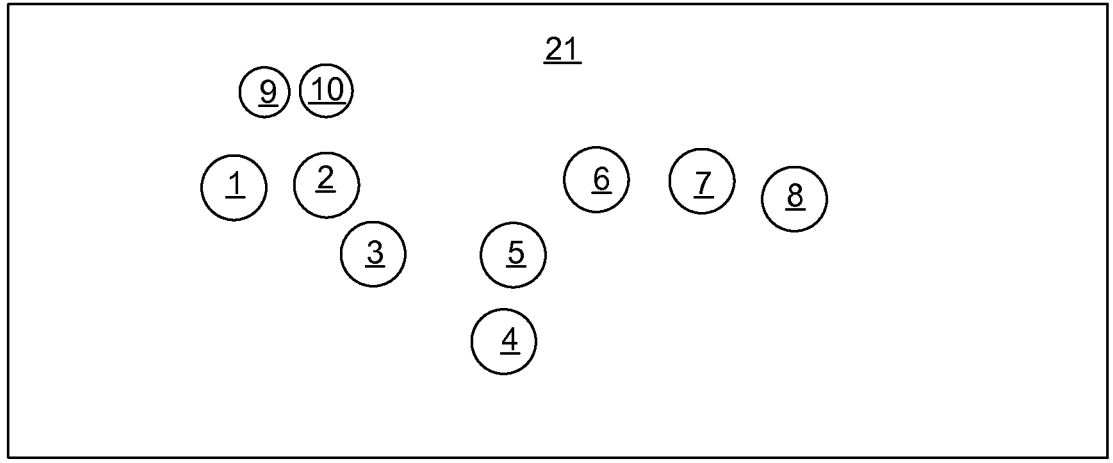
FIGS. 5-9 show multiple preferred embodiments of the present invention.
Figure 6:
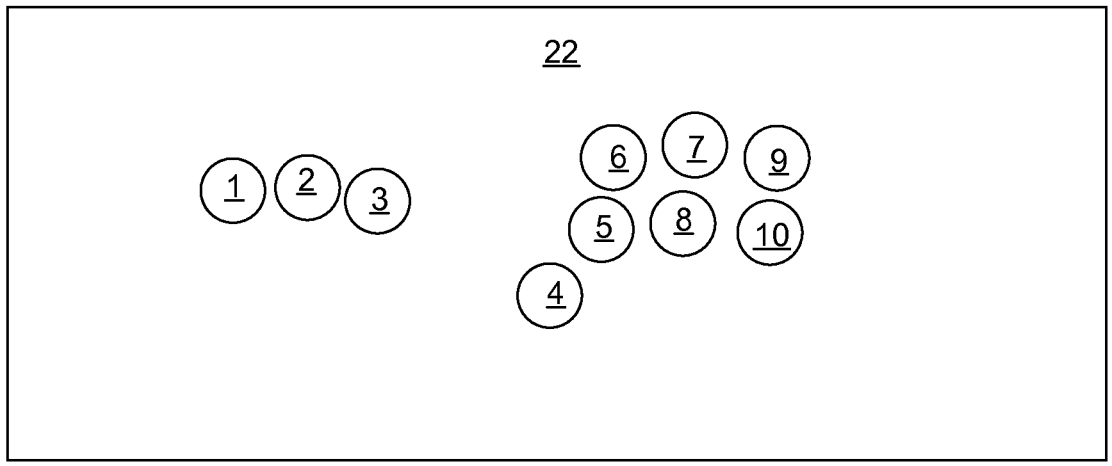
Figure 7:
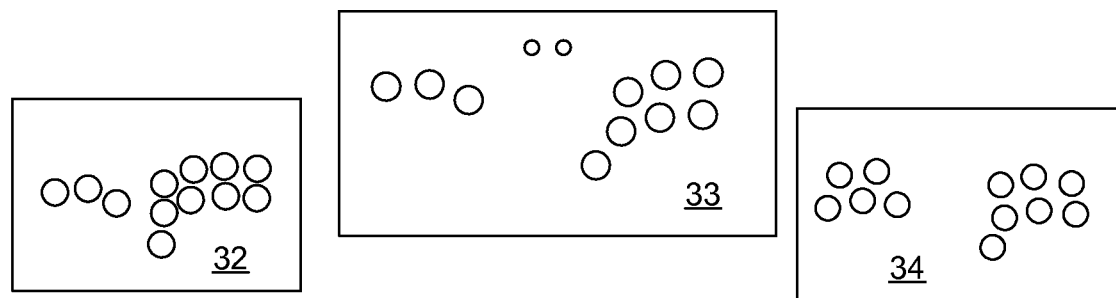
Figure 7:
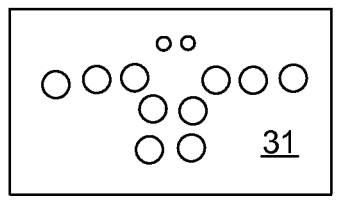
Figure 8:
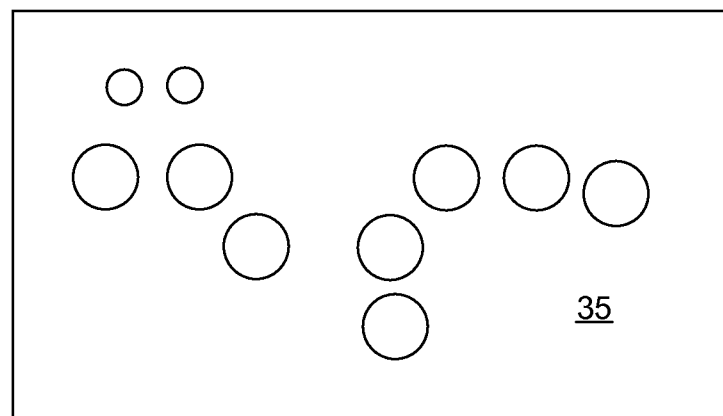

It should be understood that the specific placement of buttons can be modified as desired. The important consideration is that the buttons are placed so that the fingers of the hand can naturally reach the buttons with minimum effort, as shown in the figures. FIGS. 2-4 show one preferred positioning of buttons 1-15. It should be noted that the exact positioning, size and amount of buttons can be modified. It is preferable, however, that the position of the buttons are such that they conform to the natural contour and shape of the user's hand. For example, FIG. 5 shows controller 21 with buttons placed as shown. FIG. 6 shows controller 22 with buttons placed in an alternative style. FIG. 7 shows controllers 31-34 with buttons positioned as shown. FIG. 8 shows preferred controller 35 with buttons positioned as shown.

Figure 9:
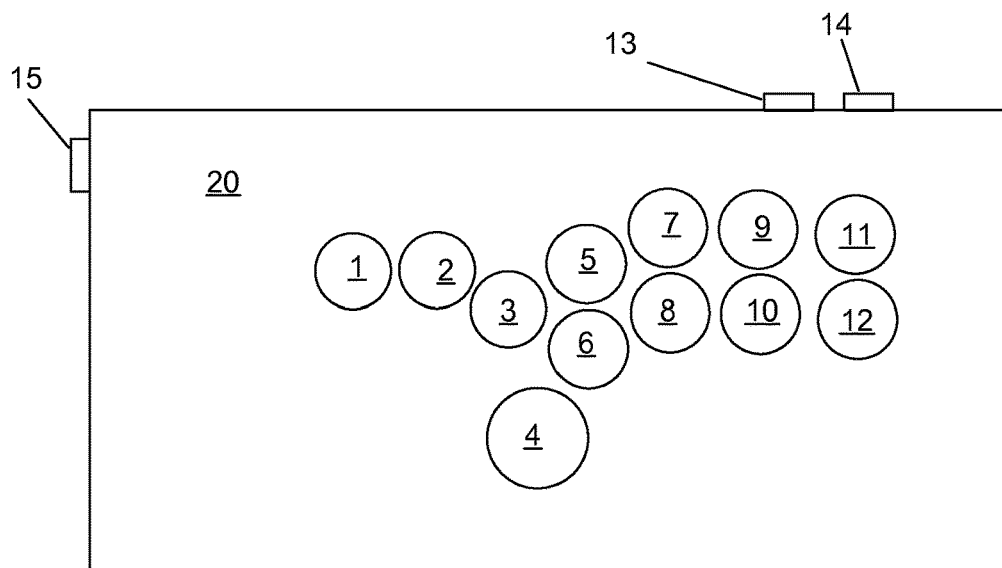
Figure 10:
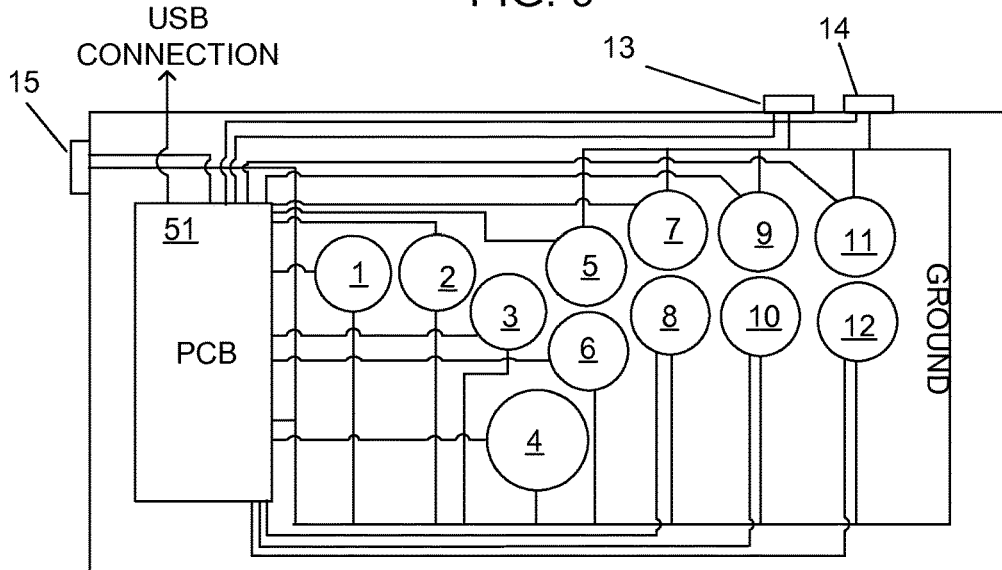
FIGS. 10-11 show preferred electrical connectivity.
Figure 11:
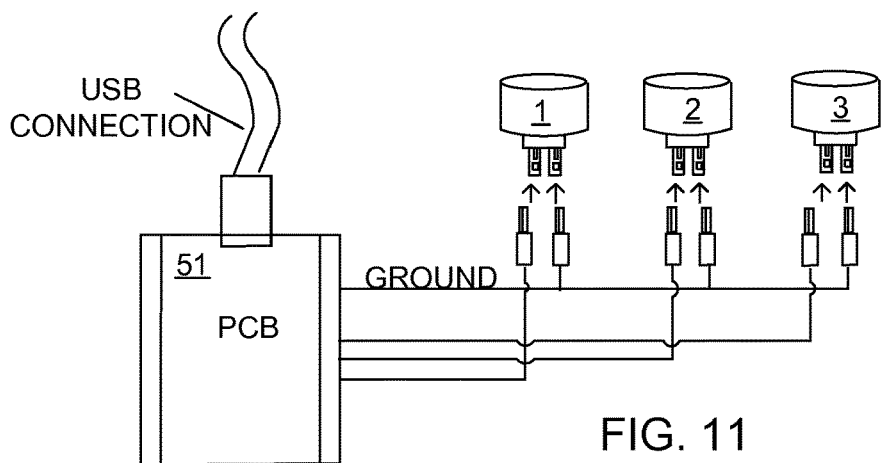
Figure 12:
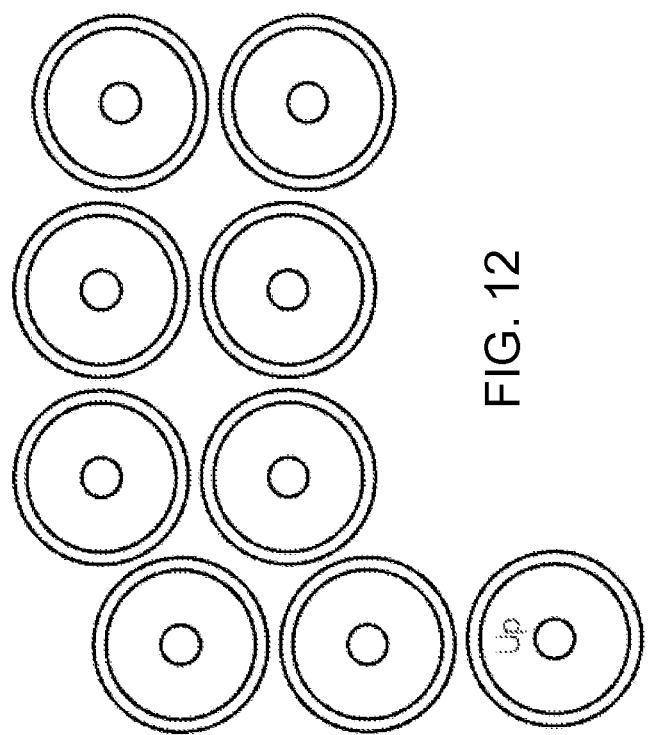
FIGS. 12-20 show multiple preferred embodiments of the present invention.
Figure 12:
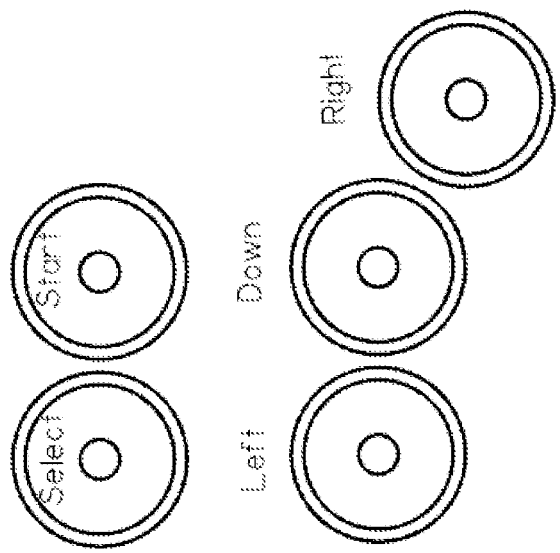
Figure 13:
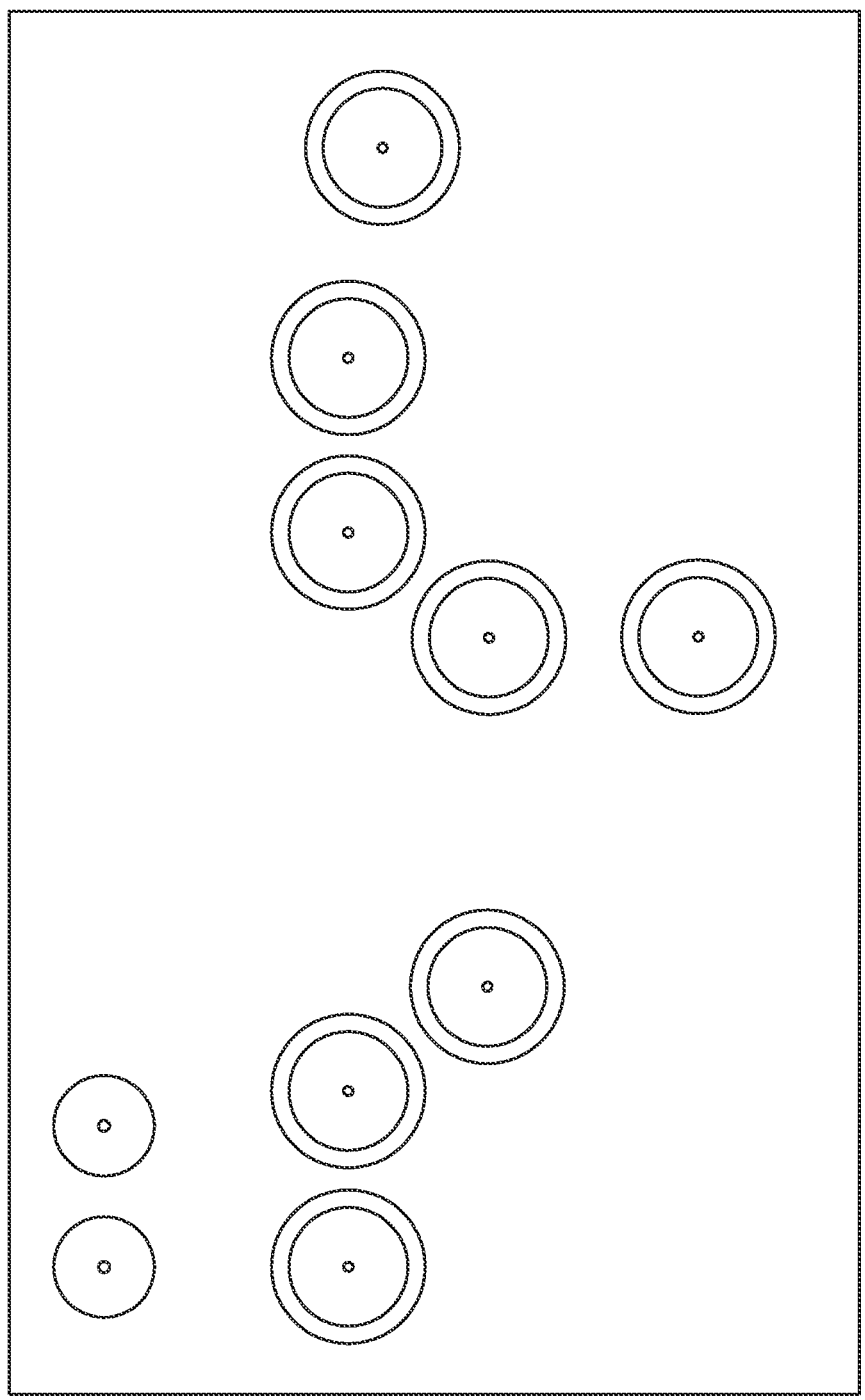
Figure 14:
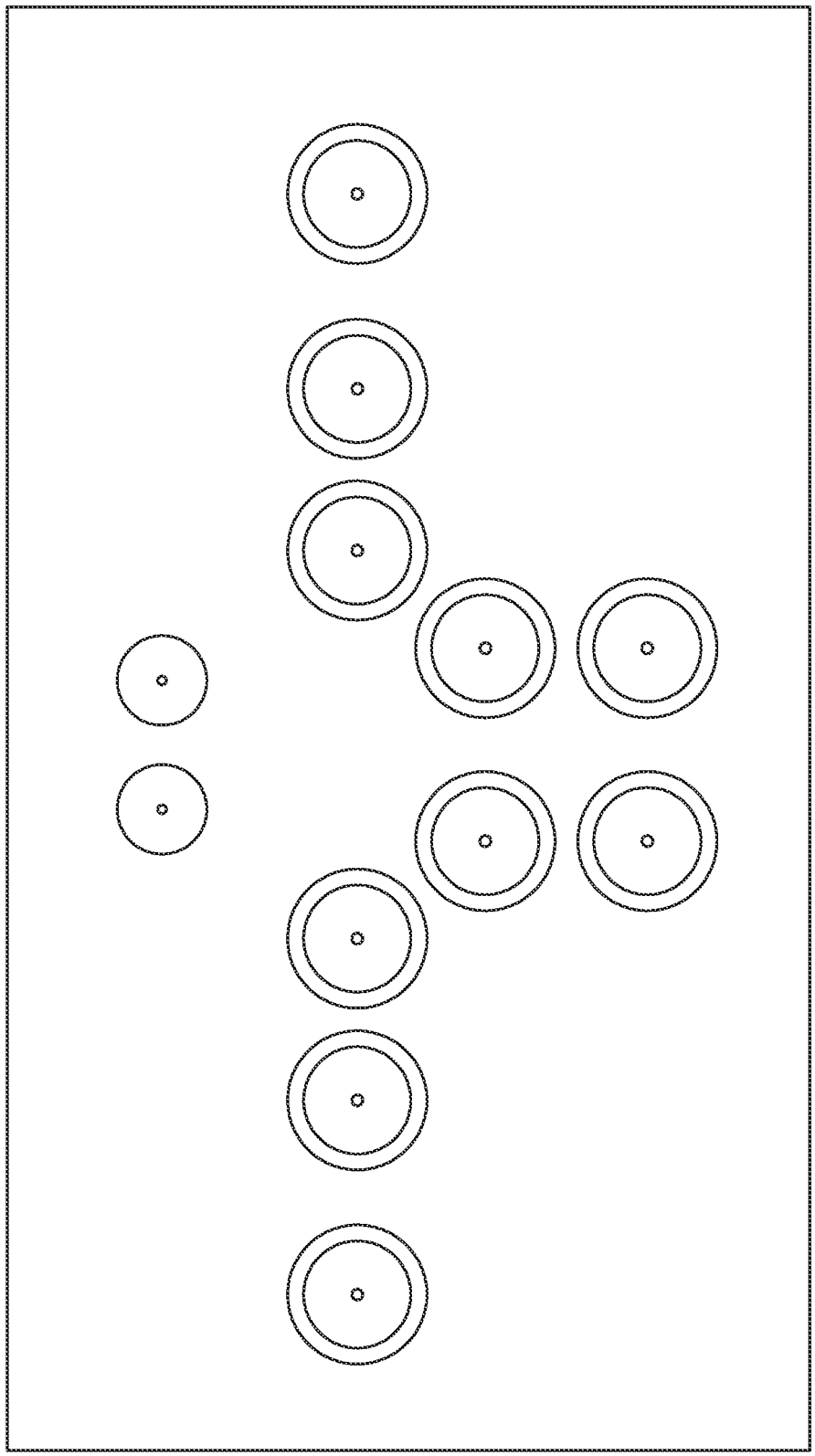
Figure 15:
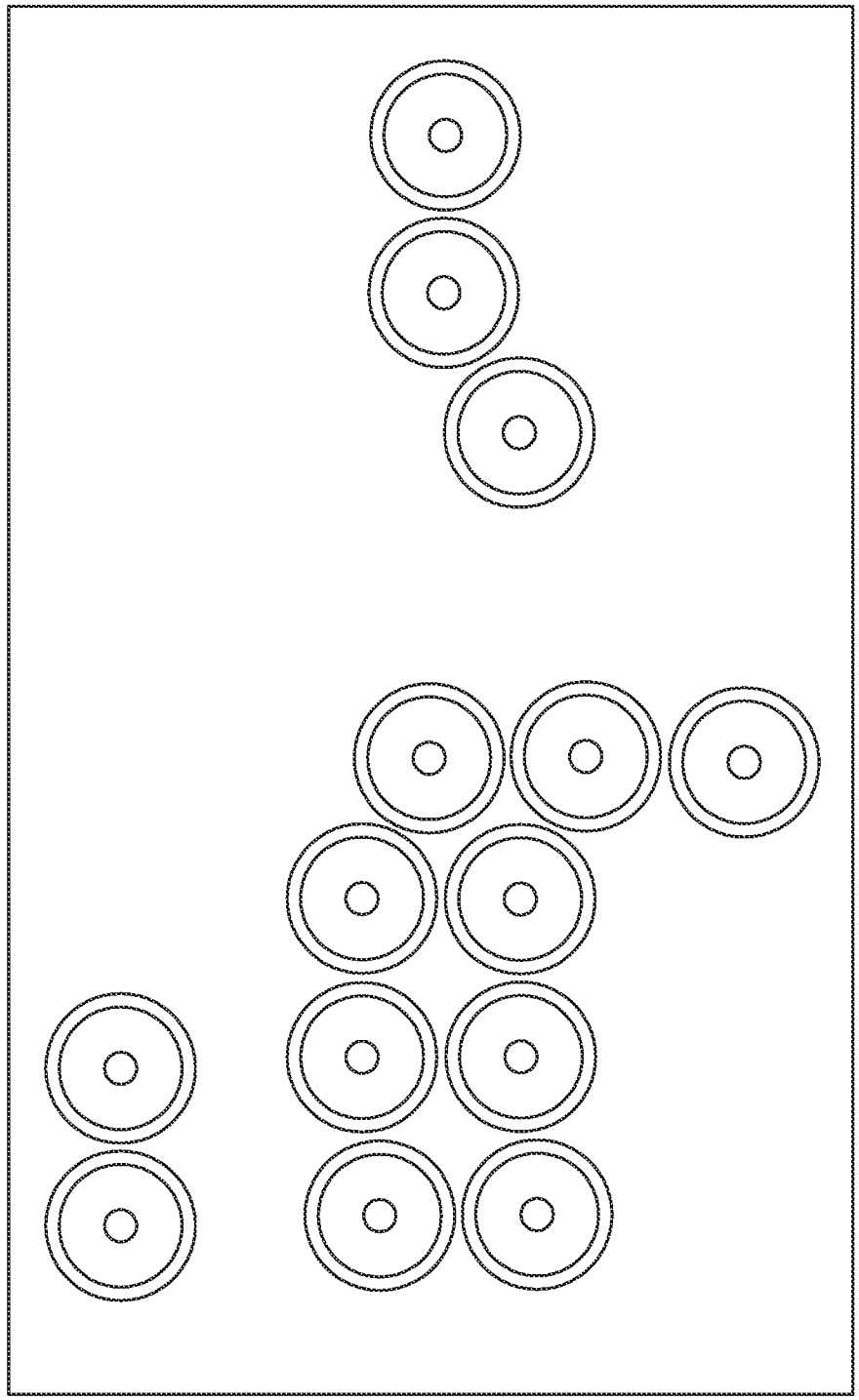
Figure 16:
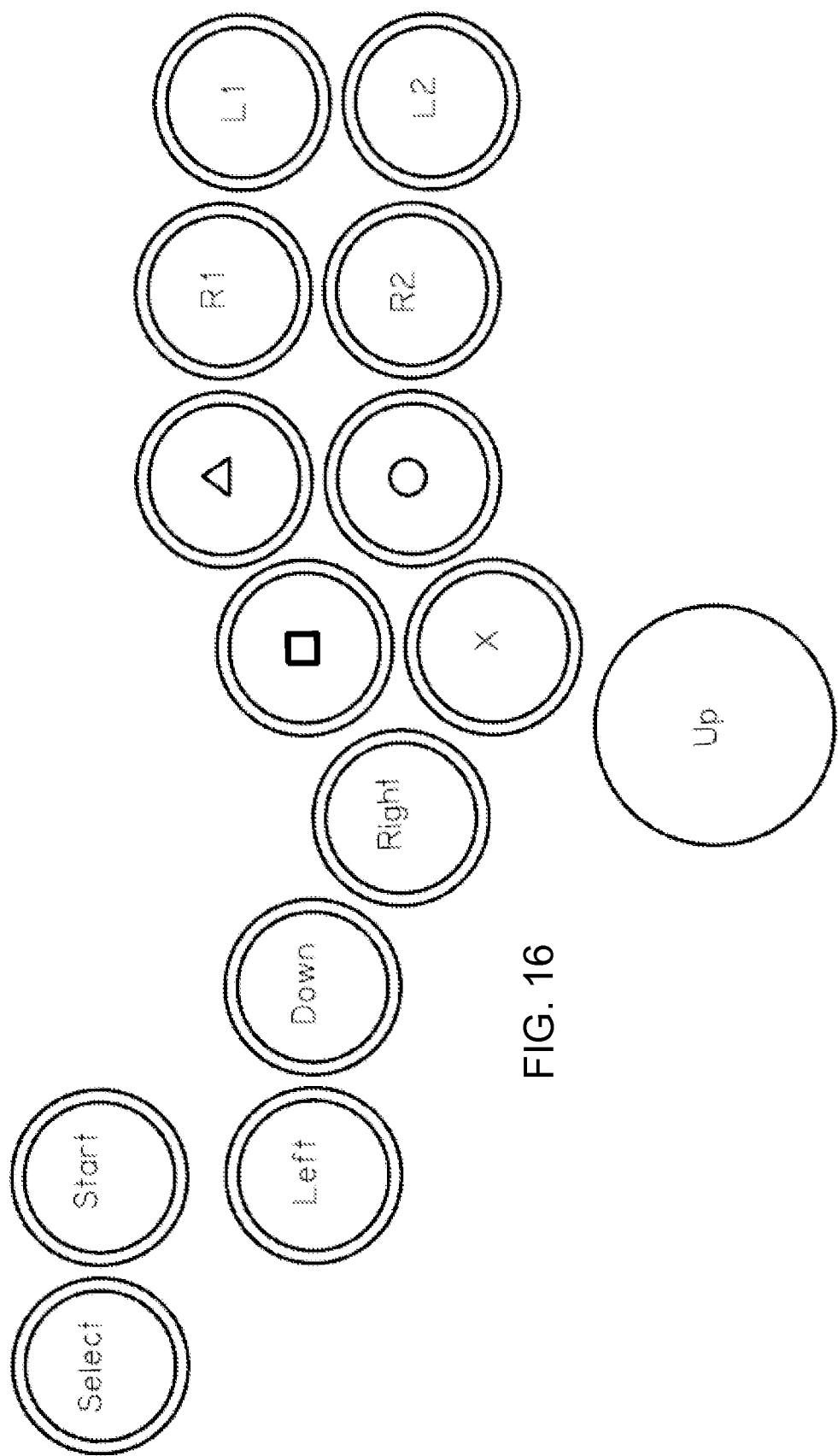
Figure 17:
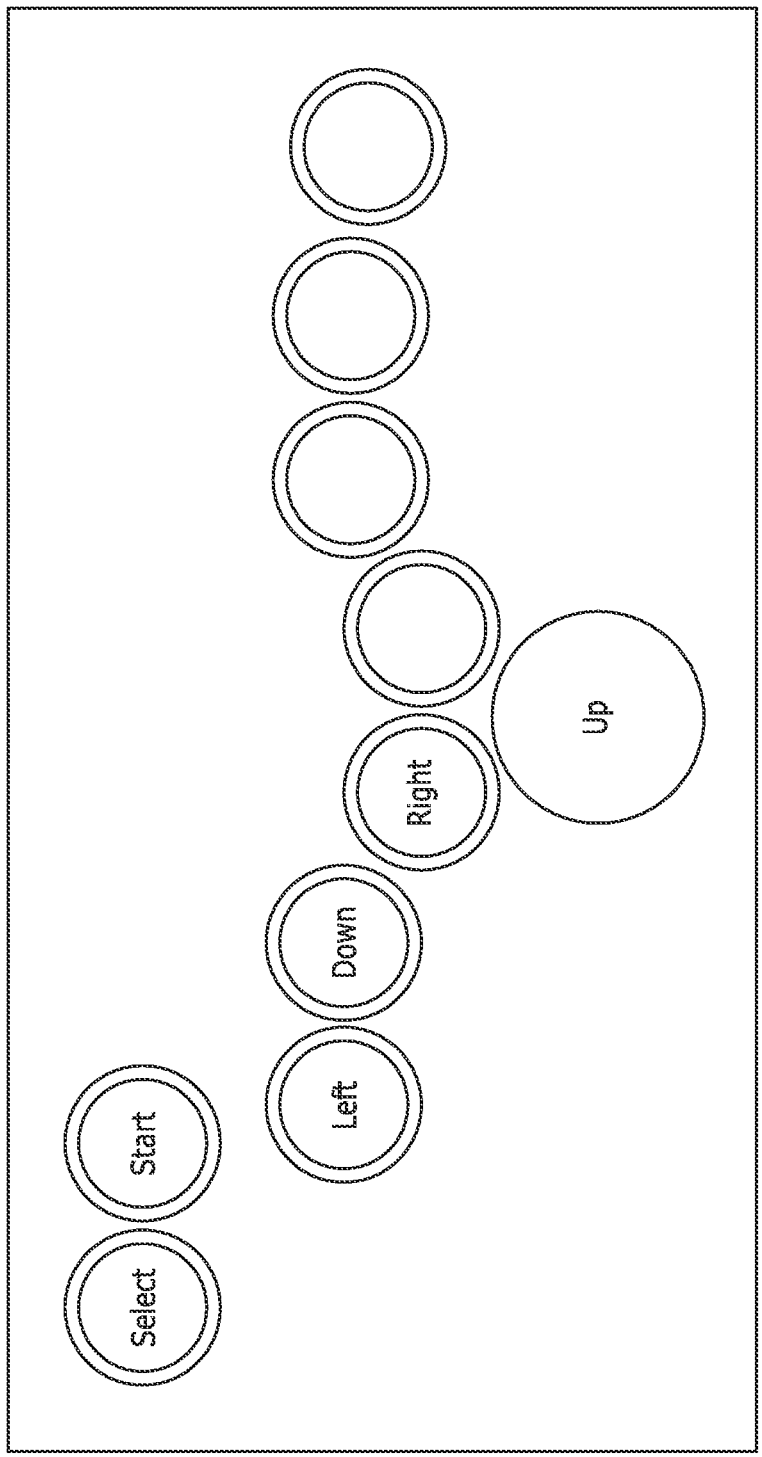
Figure 18:
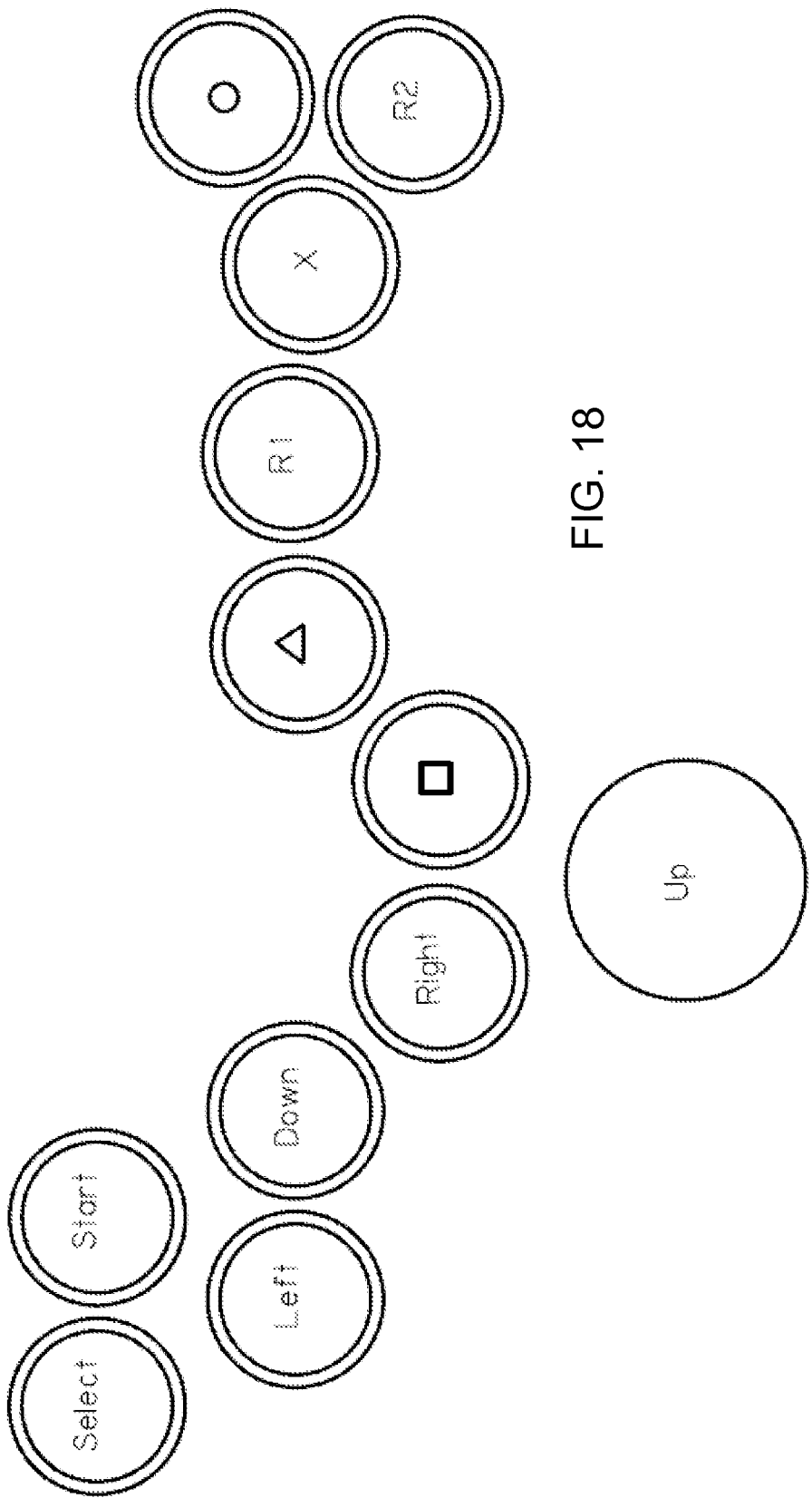

FIG. 9 shows a front view of controller 20 shown in FIG. 2. FIG. 10 shows a front see-through view of the preferred embodiment of FIG. 9. In FIGS. 10 and 11, the wiring details are displayed. FIGS. 10 and 11 show the printed circuit board (PCB) 51. In a preferred embodiment, PCB 51 is printed circuit board model no. PS360 manufactured by Akishop Corp. The PS360 PCB is an aftermarket printed circuit board which allows a user to interface with a Sony Playstation® console and an XBOX 360® console. XBOX 360® is a registered trademark of the Microsoft Corporation and refers in general to interactive game consoles. Wiring runs from the appropriate pin connections of PCB 51 to the buttons 1-15 as shown.

FIGS. 12-18 show several alternate preferred embodiments where the position of the buttons has been modified relative to each other. However, in each embodiment, the position of the buttons is arranged so that the position of the buttons matches the position of the user's fingers in a fashion similar to that shown above in reference to FIGS. 3 and 4.

Figure 19:
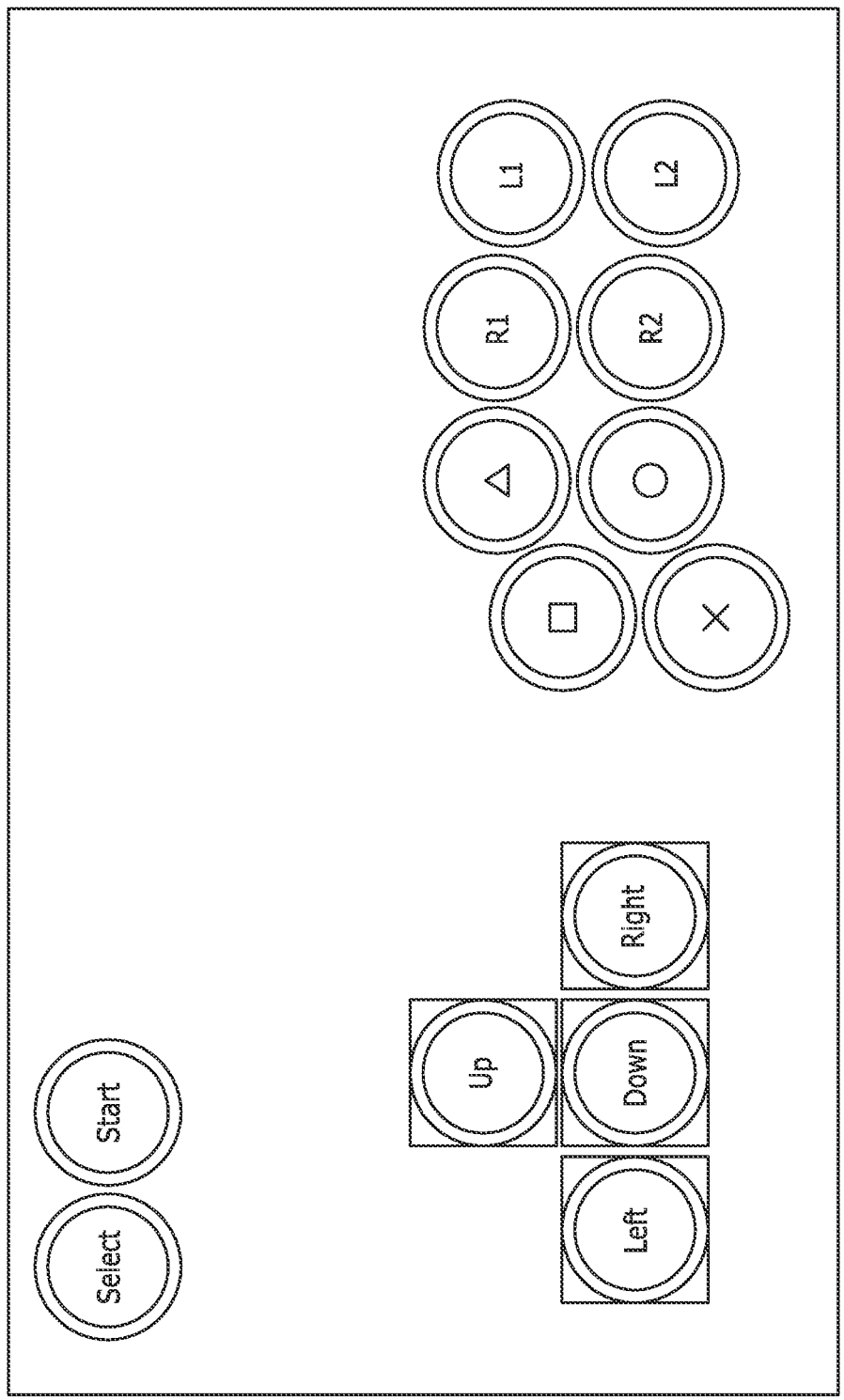
Figure 20:
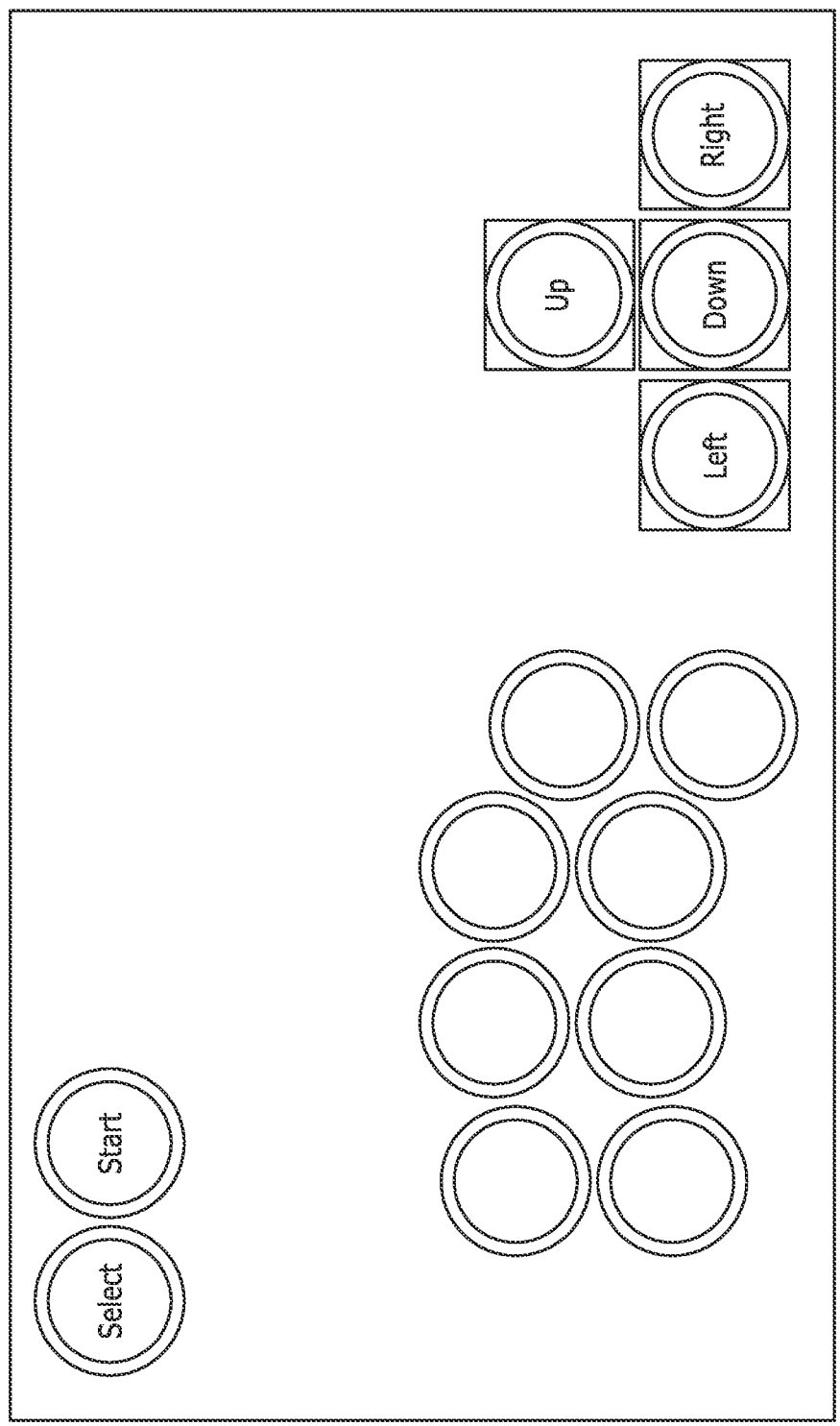

FIGS. 19 and 20 show alternate embodiments where the buttons for one hand are configured to match the natural arrangement of the user's fingers. In FIG. 19 the left hand controls buttons configured similar to the up, down, left and right arrows of a keyboard. In FIG. 20 the right hand controls buttons configured similar to the up, down, left and right arrows of a keyboard. FIGS. 19 and 20 show controllers that are preferable for gamers who are used to the up, down, left and right arrows of a keyboard.

The preferred embodiments of the present invention use smaller buttons than a traditional common joystick. These buttons create a more ergonomic layout for the human hand. The preferred embodiments are modeled after the curvature of the human hand so as to greatly reduce stress over time to reduce repetitive strain injuries (RSI's). They also eliminate the need to hover the hand around searching for buttons in game, and have all buttons instantly accessible to the hands.

As shown above, there are several preferred embodiments. All are closely related in design, but have differences in button placement and button quantity.

One preferred feature shown in FIG. 2 is the directional button inputs. "Left," "Right," and "Down" are controlled by the left hand, while the final direction "Up" is controlled by the right thumb. This unique placement of "Up" allows greater ease in performing advanced techniques in fighting games. It also eliminates the common mistake of accidental "Up" inputs.

Other preferred embodiments of the present invention place the important "Up" button on the left thumb in an ergonomic curvature of the human hand.

Some of the preferred embodiments use larger standard-sized 30 mm arcade pushbuttons.

As shown above, electrical wire connects the arcade pushbuttons to the controller's circuit board. Specifically, the directional input pushbuttons are linked to the corresponding directions on the circuit board.

The present invention is an instrument designed preferably for fighting video games. Its advantages can be appreciated by the beginning player through the champion tournament player. It is designed for gamers all across the globe.

It should be noted that although the figures show a modification of a Sony Playstation® game controller, it should be understood that a PCB of any existing game controller can be substituted for PCB 51. Some of the existing game controller PCBs that can be utilized include (but are not limited to): the Xbox® controller, the Xbox 360®, Sony Playstation® 2, Sony Playstation® 3, the Nintendo Gamecube®, controller boards and kits such as the Toodles Cthulhu for Multi-Console, any existing joystick or alternative brand controller, and many more. To modify controller 101, the printed circuit board of the prior art controller of interest is inserted into controller 101 in place of PCB 51. For example to create a controller for Nintendo Gamecube® the PCB from the Nintendo Gamecube® is removed and placed in controller 101 in place of PCB 51.

There are several sub categories in models of game controllers as well. For example, Sony Playstation® game controller Playstation 1 Digital H is different in structure than Playstation 1 Dual Shock A (Late Version), but follow the same principles. Also, it should be understood that the present invention can be fabricated as a stand alone item. For example, a new controller (not tied to an existing game unit) can be built using the principles disclosed above. It is only important that both hands are able to comfortably reach and control the push buttons in a fashion similar to that described above and that the directional buttons are controlled by the fingers.

Figure 21:
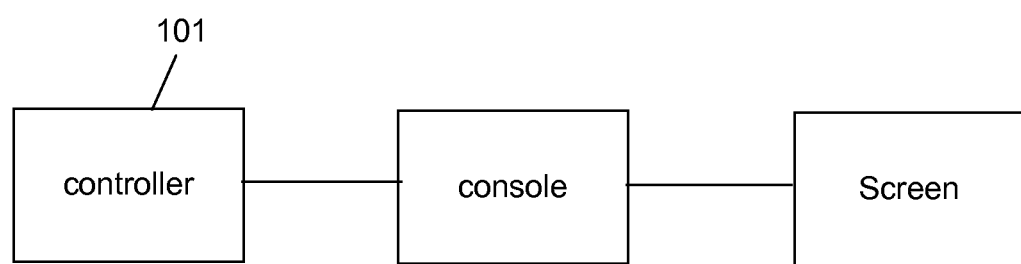
FIG. 21 shows a wire connection between a preferred controller and a console.
Figure 22:
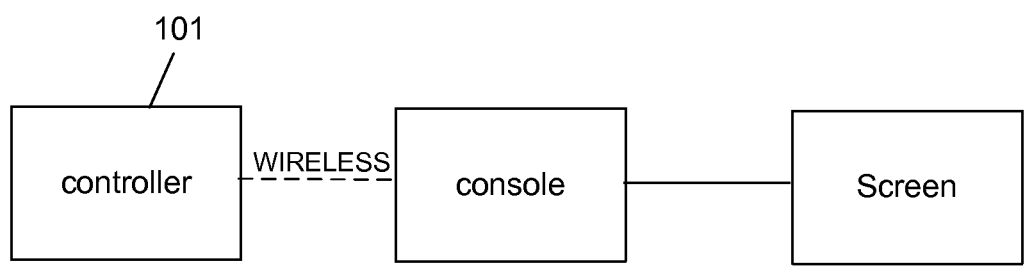
FIG. 22 shows a wireless connection between a preferred controller and a console.

It should be noted that it is possible for controller 101 to be connected to console via a wire connection (such as a USB cable shown in FIG. 21) or via a wireless connection (FIG. 22).

Although the above-preferred embodiments have been described with specificity, persons skilled in this art will recognize that many changes to the specific embodiments disclosed above could be made without departing from the spirit of the invention. For example, although FIG. 2 shows button 15 on the left side of controller 20, it can be easily moved so that it is adjacent buttons 13 and 14. It should be noted that in the preferred embodiments the buttons of ergonomic relevance are buttons 1-12, and buttons 13-15 are merely utility buttons. Therefore, the attached claims and their legal equivalents should determine the scope of the invention.

What is claimed is:

1. A hand-operated game controller for controlling a game comprising:
   a game controller surface extending horizontally between left and right edges and vertically between top and bottom edges;
   a first button which is closer to the bottom edge than the top edge;
      a first assemblage of buttons including a row of at least three buttons forming a first arcuate shape extending from a right most point to a left most point, wherein the right most point of the first actuate shape is closer to the right edge of the game controller surface than the left edge of the game controller surface and wherein the left most point of the first arcuate shape is closer to the bottom edge and left edge of the game controller surface than the right most point of the first arcuate shape is to the bottom edge and left edge;
   a second assemblage of at least three buttons forming a second arcuate shape wherein a left most point of the second arcuate shape is closer to the bottom edge of the game controller surface than the left most point of the first arcuate shape is to the bottom edge of the game controller surface;
   the second arcuate shape being at least partially aligned with the first arcuate shape, wherein the left most point and right most point of the first arcuate shape are each closer to top edge of the game controller surface than each of the left most point and the right most point of the second arcuate shape is to the top edge of the game controller surface; and
a third assemblage of buttons including at least three buttons disposed in a third arcuate shape wherein a right most point of the third arcuate shape is closer to the top edge of the game controller surface than the left most point of the second arcuate shape is to the top edge of the game controller surface, and wherein the right most point of the third arcuate shape is closer to the bottom edge of the game controller surface than the left most point of the first arcuate shape is to the bottom edge of the game controller surface.

2. The hand-operated game controller of claim 1, wherein the right most point of the third arcuate shape is closer to the right edge of the game controller surface than the left most point of the first arcuate shape and the left most point of the second arcuate shape.

3. The hand-operated game controller of claim 2, wherein the first button, the first arcuate shape, the second arcuate shape, and the third arcuate shape touch a middle dividing said game controller surface between the left and right edges.

4. The hand-operated game controller of claim 1, wherein the first button is the largest button on the game controller surface and wherein a bottom most point of the second arcuate shape is closer to the top edge of the game controller surface than a top most point of the first button.

5. The hand-operated game controller of claim 1, wherein the first button and the third assemblage of buttons generate directional inputs and the first and second assemblage of buttons provide functional inputs.

6. The hand-operated game controller of claim 1, wherein the second arcuate shape mirrors a curvature of the first arcuate shape.

7. The hand-operated game controller of claim 1, wherein the third arcuate shape is a vertical mirror of the first arcuate shape.

8. The hand-operated game controller of claim 1, including a fourth assemblage of buttons including at least two buttons which are closer to the top edge of the game controller surface than the first assemblage of buttons.

9. The hand-operated game controller of claim 1, wherein the buttons of the third assemblage of buttons are each adjacently spaced from each other and no other buttons are adjacently spaced from the buttons of the third assemblage of buttons.

10. The hand-operated game controller of claim 1, wherein the fourth assemblage of buttons are adjacently spaced from one another.

11. The hand-operated game controller of claim 1, wherein there are no other buttons adjacently spaced from the fourth assemblage of buttons.

12. The hand-operated game controller of claim 1, wherein a midpoint of the first arcuate shape is closer to the top edge of the game controller surface than the left most point and the right most point of the first arcuate shape.

13. The hand-operated game controller of claim 1, wherein a right side half of said game controller surface does not have a joystick.

14. The hand-operated game controller of claim 1, wherein a left side half of said game controller surface does not have a joystick.

15. The hand-operated game controller of claim 1, wherein every button on the controller surface has a circular shape.

16. A hand-operated game controller for controlling a game comprising:
a game controller surface extending horizontally between left and right edges and vertically between top and bottom edges;
a middle boundary dividing said game controller surface between the left and right edges to present a right side portion and a left side portion;
a first button which at least partially overlaps the middle boundary and is closer to the bottom edge of the game controller surface than the top edge of the game controller surface;
a first assemblage of buttons including a row of at least three buttons forming a first arcuate shape extending from a right most point to a left most point, wherein the right most point of the arcuate shape is closer to the right edge of the game controller surface than the left edge of the game controller surface and wherein the left most point of the first arcuate shape is closer to the bottom edge and left edge of the game controller surface than the right most point of the first arcuate shape is to the bottom edge and left edge;
a second assemblage of at least three buttons forming a second arcuate shape wherein a left most point of the second arcuate shape is closer to the bottom edge of the game controller surface than the left most point of the first arcuate shape is to the bottom edge of the game controller surface;
the second arcuate shape being at least partially aligned with the first arcuate shape, where the left most point and right most point of the first arcuate shape are each closer to top edge of the game controller surface than each of the left most point and the right most point of the second arcuate shape is to the top edge of the game controller surface;
a third assemblage of buttons including at least three buttons disposed in a third arcuate shape wherein a right most point of the third arcuate shape is closer to the top edge of the game controller surface than the left most point of the second arcuate shape is to the top edge of the game controller surface, and wherein the right most point of the third arcuate shape is closer to the bottom edge of the game controller surface than the left most point of the first arcuate shape is to the bottom edge of the game controller surface; and
where the first button the first button and the third assemblage of buttons generate directional inputs and the first and second assemblage of buttons provide functional inputs.

17. The hand-operated game controller of claim 16, wherein the right most point of the third arcuate shape is closer to the right edge of the game controller surface than the left most point of the first arcuate shape and the left most point of the second arcuate shape.

18. The hand-operated game controller of claim 16, wherein the first button, the first arcuate shape, the second arcuate shape, and the third arcuate shape touch the middle boundary.

19. The hand-operated game controller of claim 16, wherein the second arcuate shape mirrors a curvature of the first arcuate shape and the third arcuate shape is a vertical mirror of the first arcuate shape.

20. A hand-operated game controller for controlling a game comprising:
a game controller surface extending horizontally between left and right edges and vertically between top and bottom edges;

a first button which at least partially overlaps the middle boundary and is closer to the bottom edge of the game controller surface than the top edge;
a first assemblage of buttons including a row of at least three buttons forming a first arcuate shape extending from a right most point to a left most point, wherein the right most point of the arcuate shape is closer to the right edge of the game controller surface than the left edge of the game controller surface and wherein the left most point of the first arcuate shape is closer to the bottom edge of the game controller surface and left edge of the game controller surface than the right most point of the first arcuate shape is to the bottom edge and left edge;
a second assemblage of at least three buttons forming a second arcuate shape wherein a left most point of the second arcuate shape is closer to the bottom edge of the game controller surface than the left most point of the first arcuate shape is to the bottom edge of the game controller surface;
the second arcuate shape being at least partially aligned with the first arcuate shape, where the left most point and right most point of the first arcuate shape are each closer to top edge of the game controller surface than each of the left most point and the right most point of the second arcuate shape is to the top edge of the game controller surface;
a third assemblage of buttons including at least three buttons disposed in a third arcuate shape wherein a right most point of the third arcuate shape is closer to the top edge of the game controller surface than the left most point of the second arcuate shape is to the top edge of the game controller surface, and wherein the right most point of the third arcuate shape is closer to the bottom edge of the controller surface than the left most point of the first arcuate shape is to the bottom edge of the game controller surface; and
where the first button is the largest button on the game controller surface and wherein a bottom most point of the second arcuate shape is closer to the top edge of the game controller surface than a top most point of the first button.

\* \* \* \* \*